(12) United States Patent
Ikeguchi

(10) Patent No.: US 12,508,704 B2
(45) Date of Patent: Dec. 30, 2025

(54) MARKER DETECTION APPARATUS AND ROBOT TEACHING SYSTEM

(71) Applicant: DAIHEN Corporation, Osaka (JP)

(72) Inventor: Makoto Ikeguchi, Osaka (JP)

(73) Assignee: DAIHEN Corporation, Osaka (JP)

( * ) Notice: Subject to any disclaimer, the term of this patent is extended or adjusted under 35 U.S.C. 154(b) by 281 days.

(21) Appl. No.: 17/897,420

(22) Filed: Aug. 29, 2022

(65) Prior Publication Data

US 2023/0143710 A1  May 11, 2023

(30) Foreign Application Priority Data

Nov. 5, 2021  (JP) .................. 2021-181014

(51) Int. Cl.
*B25J 9/00* (2006.01)
*B25J 9/16* (2006.01)
(Continued)

(52) U.S. Cl.
CPC ............ *B25J 9/163* (2013.01); *B25J 9/1697* (2013.01); *G06T 7/70* (2017.01); *G06T 15/00* (2013.01);
(Continued)

(58) Field of Classification Search
CPC ........ B25J 9/163; B25J 9/1697; B25J 9/0081; B25J 9/1656; B25J 19/023; G06T 7/70; G06T 15/00; G06T 2200/04; G06T 2207/30204; G06T 2207/30244; G06T 2207/10028; G06T 2207/30208; G06T 7/74; G06T 3/06; G06T 7/11; G06T 17/05; H04N 13/207; G01B 11/00; G09B 25/02

See application file for complete search history.

(56) References Cited

U.S. PATENT DOCUMENTS

2011/0267483 A1* 11/2011 Kanamori .................. G06T 1/00
                                                       348/240.1
2013/0329068 A1* 12/2013 Hamanaka ........... H04N 23/631
                                                       348/218.1
(Continued)

FOREIGN PATENT DOCUMENTS

JP          2021-062463          4/2021

*Primary Examiner* — Khoi H Tran
*Assistant Examiner* — Tien Minh Le
(74) *Attorney, Agent, or Firm* — Sterne, Kessler, Goldstein & Fox P.L.L.C.

(57) ABSTRACT

Provided is a marker detection apparatus able to easily detect the position of a marker and a robot teaching system using the same. A marker detection apparatus includes: a three-dimensional plane detection unit that detects a three-dimensional plane serving as a plane in a three-dimensional space on a basis of point group data acquired by a 3D camera; a two-dimensional plane image generation unit that projects point group data constituting the detected three-dimensional plane in a perpendicular direction based on the three-dimensional plane, thereby generating a two-dimensional plane image; a marker detection unit that detects a marker from the generated two-dimensional plane image; and a marker position calculation unit that, for the detected marker included in the two-dimensional plane image, calculates three-dimensional coordinates on the three-dimensional plane.

10 Claims, 5 Drawing Sheets

(51) Int. Cl.
    *G06T 7/70*   (2017.01)
    *G06T 15/00*  (2011.01)
    *H04N 13/207* (2018.01)

(52) U.S. Cl.
    CPC ....... *H04N 13/207* (2018.05); *G06T 2200/04* (2013.01); *G06T 2207/30204* (2013.01); *G06T 2207/30244* (2013.01)

(56) References Cited

U.S. PATENT DOCUMENTS

| | | | |
|---|---|---|---|
| 2016/0059419 A1* | 3/2016 | Suzuki | B25J 9/1692 |
| | | | 901/14 |
| 2016/0117824 A1* | 4/2016 | Amma | G06T 7/73 |
| | | | 382/103 |
| 2016/0155013 A1* | 6/2016 | Kobori | G06T 11/60 |
| | | | 382/190 |
| 2019/0258225 A1* | 8/2019 | Link | G06T 7/70 |
| 2021/0114231 A1 | 4/2021 | Katagiri et al. | |
| 2022/0168902 A1* | 6/2022 | Stenbacka | G06F 3/011 |
| 2022/0226923 A1* | 7/2022 | Hanada | G05B 19/4183 |
| 2023/0334705 A1* | 10/2023 | Yano | G06T 9/00 |
| 2024/0062387 A1* | 2/2024 | Frantz | G06T 7/579 |

* cited by examiner

MARKER DETECTION APPARATUS AND ROBOT TEACHING SYSTEM

BACKGROUND

Field

The present invention relates to a marker detection apparatus and a robot teaching system.

Description of Related Art

In recent years, many robots have become prevalent in industrial fields. The robots are used in, for example, assembling of electronic components and machine components, welding, transportation, or the like, making production lines of factories more efficient and automatized.

For example, a program for causing a welding robot to perform a desired operation is needed to be generated and stored in advance as so as to be used as so-called teaching data. In order to generate the teaching data, an operator cooperates with a robot control apparatus using a teaching pendant and operates an actual robot to record the operation.

When an operator generates teaching data while actually operating a robot using a teaching pendant, dependence on the skills of the operator may be large and a long time may be needed in some cases. Therefore, in order to reduce burdens on an operator, a robot system that recognizes the position of a robot using an AR device and a marker has been disclosed (for example, Patent Publication JP-A-2021-62463).

In a technology disclosed in Patent Publication JP-A-2021-62463, an AR device simultaneously detects two reference markers and recognizes a positional relationship with a robot coordinate system specification marker to recognize the position or orientation of a robot while suppressing the deviation of the display position of an AR graphic. Such a robot system is needed to appropriately detect a marker as a reference in order to accurately recognize the positions or orientations of a workpiece and a robot.

SUMMARY

However, in the technology disclosed in Patent Publication JP-A-2021-62463, camera parameters for determining three-dimensional coordinates corresponding to respective pixels of a two-dimensional image are needed to be set in advance in order to calculate a three-dimensional position from the two-dimensional image when a two-dimensional camera is, for example, used to detect a marker. Therefore, complicated preparations are needed in advance.

In view of this, the present invention has an object of providing a marker detection apparatus able to easily detect the position of a marker and a robot teaching system using the same.

An aspect of the present invention provides a marker detection apparatus including: a three-dimensional plane detection unit that detects a three-dimensional plane serving as a plane in a three-dimensional space on a basis of point group data acquired by a 3D camera; a two-dimensional plane image generation unit that projects point group data constituting the detected three-dimensional plane in a perpendicular direction based on the three-dimensional plane, thereby generating a two-dimensional plane image; a marker detection unit that detects a marker from the generated two-dimensional plane image; and a marker position calculation unit that, for the detected marker included in the two-dimensional plane image, calculates three-dimensional coordinates on the three-dimensional plane.

According to the aspect, the three-dimensional plane detection unit detects a three-dimensional plane on a basis of point group data acquired by a 3D camera, and a two-dimensional plane image generation unit projects point group data constituting the three-dimensional plane in a perpendicular direction based on the three-dimensional plane to generate a two-dimensional plane image. Then, a marker detection unit detects a marker from the two-dimensional plane image, and a marker position calculation unit calculates three-dimensional coordinate values (X, Y, Z) on the three-dimensional plane for the marker included in the two-dimensional plane image. Thus, it is possible to appropriately detect the position of a marker set on a plane. Further, it is possible to easily detect the position of a marker set on a plane without setting complicated camera parameters. Therefore, this leads to a reduction in product costs.

In the above aspect, the marker detection unit may detect a marker for each plane when a plurality of three-dimensional planes are detected by the three-dimensional plane detection unit.

According to the aspect, the marker detection unit detects a marker for each plane when a plurality of three-dimensional planes are detected. Therefore, it is possible to efficiently and reliably detect a marker.

In the above aspect, the marker detection unit may detect a marker in descending order of areas with respect to the plurality of three-dimensional planes.

According to the aspect, the marker detection unit detects a marker in descending order of an area with respect to a plurality of three-dimensional planes. Therefore, processing is performed in descending order of a possibility of setting a marker, by which it is expectable that a marker is detected at an early stage. This leads to a reduction in computation processing and shortening of a processing time.

In the above aspect, the marker detection unit may detect a marker in order of distances from a center of a field of vision with respect to the plurality of three-dimensional planes.

According to the aspect, the marker detection unit detects a marker in order of distance from a center of a field of vision with respect to a plurality of three-dimensional planes. Therefore, processing is performed in descending order of a possibility of setting a marker, by which it is expectable that a marker is detected at an early stage. This leads to a reduction in computation processing and shortening of a processing time.

An aspect of the present invention provides a robot teaching system including: a photographing unit having a 3D camera that photographs an image including a workpiece and a marker; a three-dimensional plane detection unit that detects a three-dimensional plane serving as a plane in a three-dimensional space on a basis of point group data acquired by the 3D camera; a two-dimensional plane image generation unit that projects point group data constituting the detected three-dimensional plane in a perpendicular direction based on the three-dimensional plane, thereby generating a two-dimensional plane image; a marker detection unit that detects a marker from the generated two-dimensional plane image; a marker position calculation unit that, for the detected marker included in the two-dimensional plane image, calculates three-dimensional coordinates on the three-dimensional plane; a camera coordinate system setting unit that sets a camera coordinate system on a basis of the calculated three-dimensional coordinates of the marker; and a program generation unit that generates a working program for operating a manipulator, while converting an operation path of the manipulator in the camera coordinate system into a robot coordinate system set in a robot control apparatus.

According to the aspect, the three-dimensional plane detection unit detects a three-dimensional plane on a basis of point group data acquired by a 3D camera, and a two-dimensional plane image generation unit projects point group data constituting the three-dimensional plane in a perpendicular direction based on the three-dimensional plane to generate a two-dimensional plane image. Further, a marker detection unit detects a marker from the two-dimensional plane image, a marker position calculation unit calculates three-dimensional coordinate values (X, Y, Z) on the three-dimensional plane for the marker included in the two-dimensional plane image. A camera coordinate system setting unit sets a camera coordinate system on a basis of the three-dimensional coordinates of the marker calculated by the marker position calculation unit, and a program generation unit generates a working program for operating a manipulator, while converting an operation path of the manipulator in the camera coordinate system into a robot coordinate system set in a robot control apparatus. As a result, a camera coordinate system is set on a basis of the three-dimensional coordinates of an appropriately-detected marker, and a working program is generated. Therefore, it is possible to more easily and appropriately operate a manipulator.

According to the present invention, it is possible to provide a marker detection apparatus able to easily detect the position of a marker and a robot teaching system using the same.

DETAILED DESCRIPTION

Hereinafter, embodiments of the present invention will be specifically described with reference to the drawings. Note that the following embodiments only show a specific example for carrying out the present invention and do not intend to interpret the present invention in a limited way. Further, in order to facilitate the understanding of the description, the same constituting elements are denoted by the same symbols as much as possible in the respective drawings, and duplicated descriptions may be omitted in some cases.

Embodiment

Basic Configuration of Welding Robot System

Figure 1:
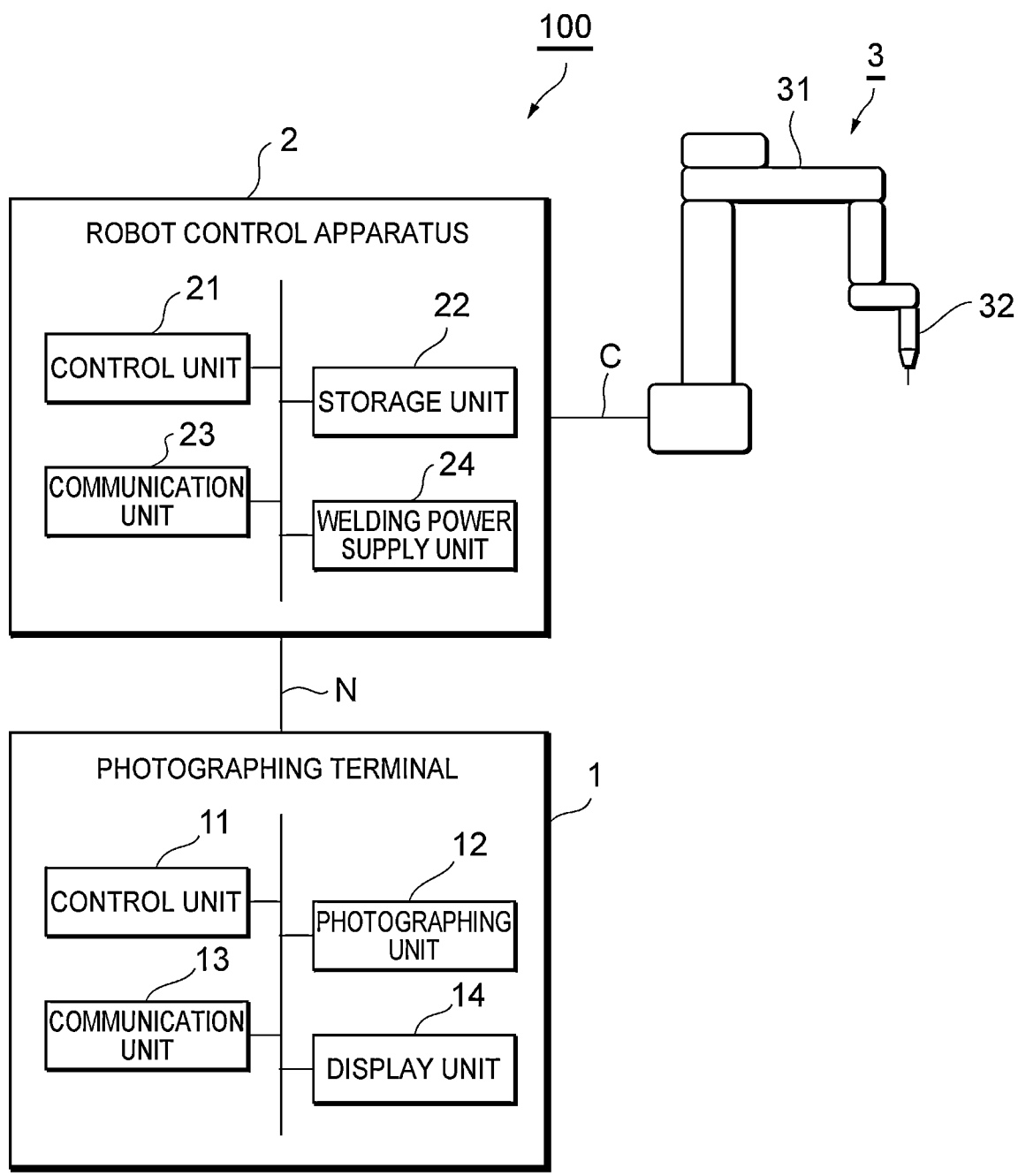
FIG. 1 is a diagram exemplifying the configuration of a welding robot system 100 including a robot teaching system according to an embodiment of the present invention.

FIG. 1 is a diagram exemplifying the configuration of a welding robot system 100 including a robot teaching system according to an embodiment of the present invention. As shown in FIG. 1, the welding robot system 100 includes, for example, a photographing terminal 1, a robot control apparatus 2, and a manipulator 3. The photographing terminal 1 and the robot control apparatus 2 are connected to each other via, for example, a network N, and the robot control apparatus 2 and the manipulator 3 are connected to each other via, for example, a communication cable C. The network N may be a wired network (including a communication cable) or a wireless network. Note that the welding robot system 100 may include a teaching pendant. The teaching pendant is an operating apparatus with which an operator teaches the operation of the manipulator 3.

The manipulator 3 is a welding robot (industrial robot) that performs arc welding according to construction conditions set in the robot control apparatus 2. The manipulator 3 has, for example, an articulated arm 31 provided on a base member fixed to a floor or the like of a factory and a welding torch 32 (end effector) connected to the tip end of the articulated arm 31.

The robot control apparatus 2 is a control unit that controls the operation of the manipulator 3 and includes, for example, a control unit 21, a storage unit 22, a communication unit 23, and a welding power supply unit 24.

The control unit 21 runs, for example, a working program stored in the storage unit 22 with a processor to control the manipulator 3 and the welding power supply unit 24.

The communication unit 23 controls communication with the photographing terminal 1 connected via the network N or communication with the manipulator 3 connected via the communication cable C.

The welding power supply unit 24 supplies, in order to, for example, generate an arc between the tip end of a welding wire and a workpiece, a welding current, a welding voltage, or the like to the manipulator 3 according to previously-set welding construction conditions. The welding construction conditions include, for example, data items such as a welding condition, a welding start position, a welding end position, an arc discharge time, a welding distance, and the attitude and movement speed of a welding torch. The welding power supply unit 24 may be provided separately from the robot control apparatus 2.

The photographing terminal 1 is a 3D camera and used to acquire coordinate data corresponding to a photographing target and grasp the shape of the photographing target using point group data. For example, the photographing terminal 1 may compute coordinate data corresponding to a photographing target on the basis of a plurality of images obtained by photographing the photographing target at a plurality of different positions and acquire the same. In this case, the photographing terminal 1 may use a three-dimensional measurement method based on a known stereo method. Further, the photographing terminal 1 may use a distance measurement sensor such as a LiDAR (Light Detection and Ranging) sensor, a millimeter wave sensor, and an ultrasonic sensor. The photographing terminal 1 may irradiate a photographing target with laser light and acquire point group data on the basis of the reflected light to grasp the shape of the photographing target.

Note that the 3D camera may be a portable terminal with a 3D camera. The portable terminal includes, for example, transportable terminal such as a tablet terminal, a smart phone, a mobile information terminal (PDA), and a notebook PC (personal computer). The photographing terminal 1 includes, for example, a control unit 11, a photographing unit 12, a communication unit 13, and a display unit 14.

The control unit 11 runs a prescribed program stored in a memory with a processor to control the respective units of the photographing terminal 1.

As described above, the photographing unit 12 acquires, for example, coordinate data acquired by a three-dimensional measurement method based on a known stereo method or coordinate data acquired by performing a 3D scan with a distance measurement sensor or the like as point group data. Note that the point group data may include, for example, position (distance) information indicated by three-dimensional coordinate values (X, Y, Z), color information indicated by (R, G, B), or the like.

The communication unit 13 controls communication with the robot control apparatus 2 connected via the network N.

The display unit 14 is, for example, a display having a touch panel and receives an input such as operating instructions by an operator while displaying the shape of a subject on the basis of point group data acquired by the photographing unit 12. The display unit 14 may be provided separately from the photographing terminal 1 as, for example, a display apparatus having a touch panel.

Configuration of Robot Teaching System

Figure 2:
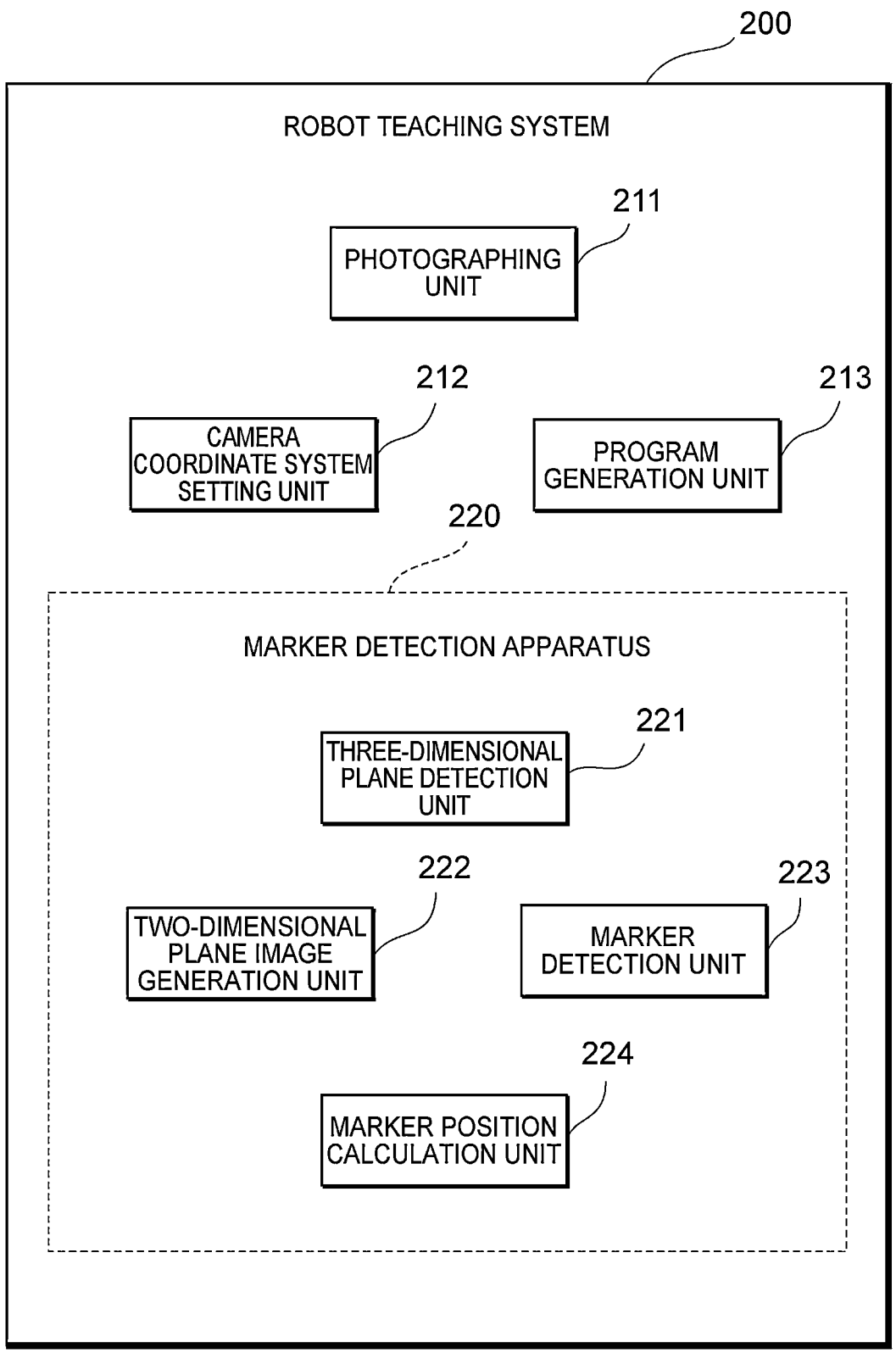
FIG. 2 is a diagram exemplifying the functional configuration of a robot teaching system 200 according to an embodiment of the present invention.

FIG. 2 is a diagram exemplifying the functional configuration of a robot teaching system 200 according to an embodiment of the present invention. As shown in FIG. 2, the robot teaching system 200 has, for example, a photographing unit 211, a camera coordinate system setting unit 212, a program generation unit 213, and a marker detection apparatus 220 that detects a marker serving as a reference for setting a camera coordinate system as the functional configuration. Note that the marker detection apparatus 220 includes a three-dimensional plane detection unit 221, a two-dimensional plane image generation unit 222, a marker detection unit 223, and a marker position calculation unit 224.

Among these functions, the photographing unit 211 is a function provided in the photographing terminal 1. On the other hand, all the respective units of the camera coordinate system setting unit 212, the program generation unit 213, and the marker detection apparatus 220 may be provided in any of the photographing terminal 1 and the robot control apparatus 2, or the respective functions may be dispersively provided in the photographing terminal 1 and the robot control apparatus 2. Further, apparatuses other than the photographing terminal 1 and the robot control apparatus 2 may include a part or all of the above functions.

The photographing unit 211 is the same as the photographing unit 12 of the photographing terminal 1 and acquires point group data as a 3D camera function. Note that the photographing unit 211 acquires point group data including at least a marker and a workpiece to be welded.

The camera coordinate system setting unit 212 sets a camera coordinate system on the basis of a marker recognized by point group data acquired by the photographing unit 211. For example, the camera coordinate system setting unit 212 sets, using the position of a marker recognized by point group data acquired by the photographing unit 211 as an origin, a three-dimensional orthogonal coordinate system with X, Y, and Z axes orthogonal to each other at the origin as a camera coordinate system.

Figure 3:
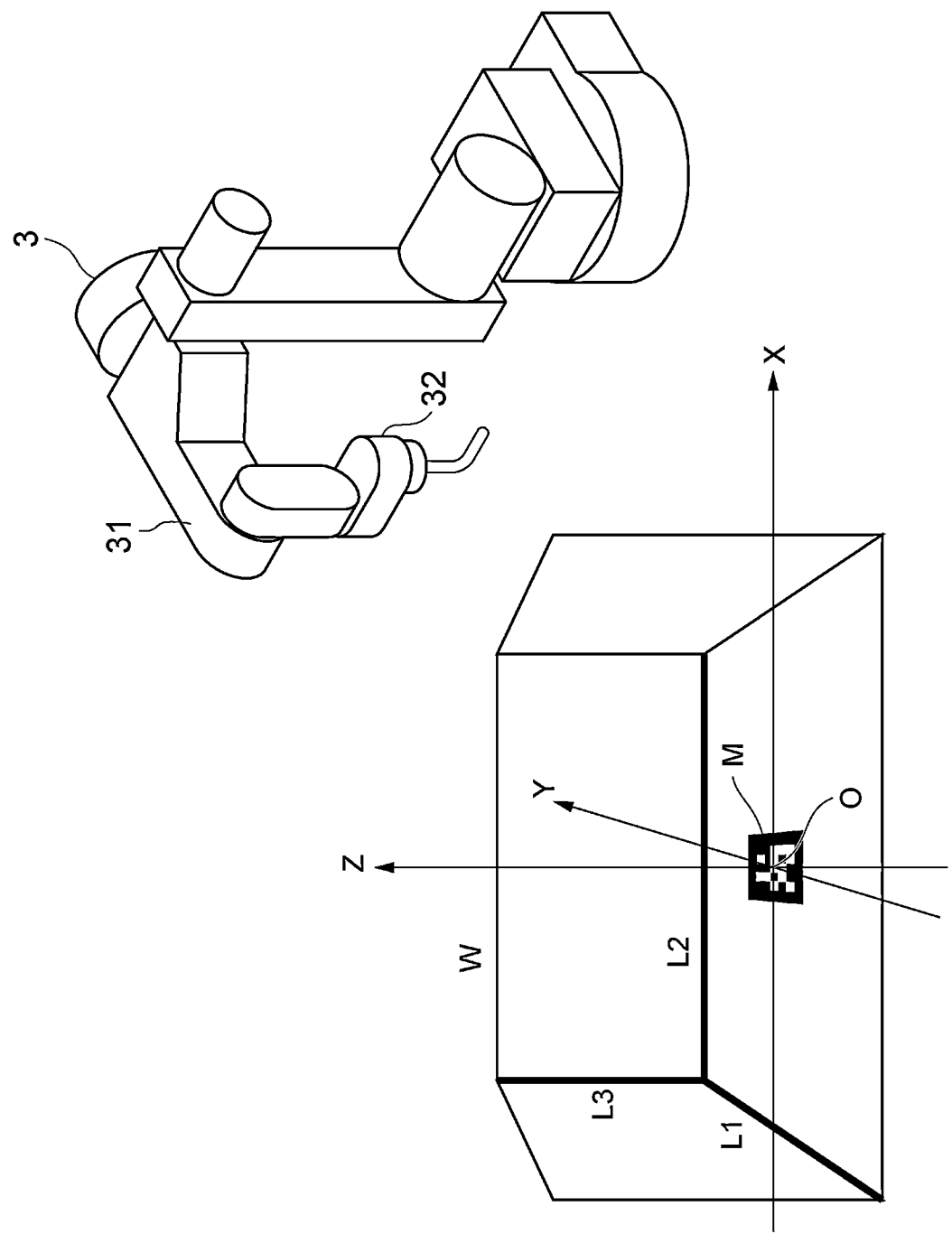
FIG. 3 is a diagram showing a state in which a marker M is set in a workpiece W to be welded and a camera coordinate system is set with the position of the marker M as an origin O.

FIG. 3 is a diagram showing a state in which a marker M is set in a workpiece W to be welded and a camera coordinate system is set with the position of the marker M as an origin O. As shown in FIG. 3, the marker M is set in the bottom plate of the workpiece W, and the camera coordinate system setting unit 212 sets, using the position of the marker M recognized by point group data acquired by the photographing unit 211 as the origin O, a three-dimensional orthogonal coordinate system with X, Y, and Z axes orthogonal to each other at the origin O as the camera coordinate system. Note that an arbitrary point in the marker M is set as the origin O. For example, a previously-set point, a central point, a selected point, or the like in the marker M is only required to be set as the origin O.

The marker M is only required to be an identifier that allows the photographing unit 211 to recognize a state in which the marker M is placed in a space. An AR marker is, for example, preferably used as a marker. Through the use of the AR marker, it is possible to easily display a camera coordinate system using the AR marker as an origin on actually-acquired point group data when the AR marker placed in a space is recognized. Note that the details of the processing of the marker detection apparatus 220 that detects the marker M will be described later.

In a camera coordinate system set by the camera coordinate system setting unit 212, the operation path of the manipulator 3 is set on the basis of welding positions L1, L2, and L3 of the workpiece W recognized from point group data acquired by the photographing unit 211. For example, the welding positions L1, L2, and L3 are recognized from point group data acquired by the photographing unit 211, and the operation path of the manipulator 3 (welding torch 32) is manually selected by a user or distances between the welding positions L1, L2, and L3 and the welding torch 32 are calculated and automatically set so that the welding torch 32 attached to the tip end of the manipulator 3 operates along the welding positions L1, L2, and L3 of the workpiece W.

On the other hand, the robot control apparatus 2 grasps the position and attitude of the manipulator 3 from information on the angles of the respective axes of the manipulator 3 that are controlled by the robot control apparatus 2, or the like (robot coordinate system). Then, on the basis of the installed position of the marker M and the position and attitude (installed position) of the manipulator 3 with respect to the installed position of the marker M, the robot control apparatus 2 is able to perform calibration to match a camera coordinate system and the robot coordinate system to each other. The calibration may be performed by, for example, aligning the tip end of the manipulator 3 (welding torch 32) with the installed position of the marker M.

The program generation unit 213 generates a working program for operating the manipulator 3, while converting the operation path of the manipulator 3 set in the camera coordinate system from a camera coordinate system into a robot coordinate system set in the robot control apparatus 2.

As described above, the robot teaching system 200 sets a camera coordinate system on the basis of the marker M recognized from point group data acquired by the photographing unit 211, and generates a working program for appropriately performing welding at the welding positions L1, L2, and L3 by the manipulator 3, while converting the welding positions L1, L2, and L3 in the camera coordinate system and the operation path of the manipulator 3 into a robot coordinate system. Then, the working program is stored in the storage unit of the robot control apparatus 2. The robot control apparatus 2 controls the operation of the manipulator 3 on the basis of the working program and is thus able to appropriately perform welding at the welding positions L1, L2, and L3 of the workpiece W as the welding robot system 100.

Details of Processing in Marker Detection Apparatus 220

As described above, a camera coordinate system is set with the position of a marker M as an origin O. Therefore, it is important to appropriately detect the position of the marker M. Hereinafter, the processing of the marker detection apparatus 220 that detects the position of a marker M will be described in detail.

FIGS. 4A to 4F are diagrams schematically showing the state of specific processing in the marker detection apparatus 220 that detects the position of a marker M set in a workpiece W. As shown in FIGS. 4A to 4F, the marker detection apparatus 220 detects the position of the marker M on the basis of point group data acquired by a 3D camera.

Figure 4A:
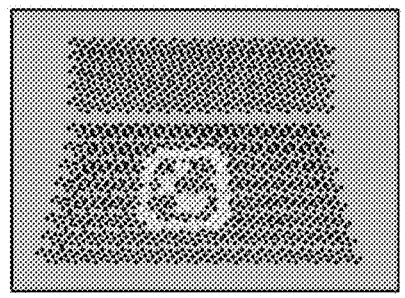
FIGS. 4A to 4F are diagrams schematically showing the state of specific processing in a marker detection apparatus 220 that detects the position of the marker M set in the workpiece W.

As shown in FIG. 4A, the point group data acquired by the 3D camera is drawn. For example, the photographing unit 211 acquires coordinate data acquired by a three-dimensional measurement method based on a known stereo method or coordinate data acquired by performing a 3D scan with a distance measurement sensor or the like as the point group data.

Figure 4B:
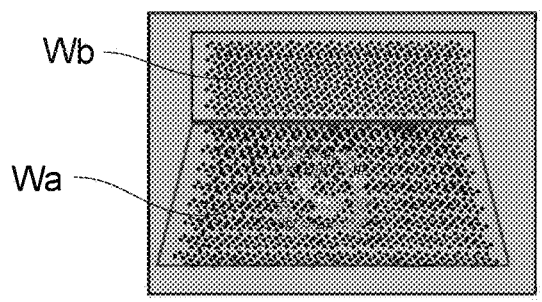

The three-dimensional plane detection unit 221 detects, on the basis of the point group data acquired by the 3D camera, a three-dimensional plane serving as a plane in a three-dimensional space (FIG. 4B). For example, the three-dimensional plane detection unit 221 detects, on the basis of the point group data acquired by the photographing unit 2112, a plane Wa serving as a bottom plate and a plane Wb serving as a rear plate that constitute the workpiece W with the assumption that the three-dimensional plane is a plane having a prescribed area or more.

Figure 4C:
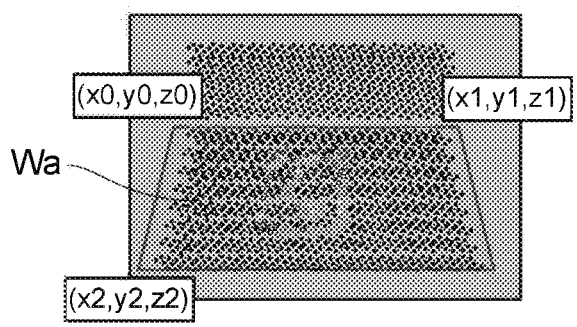
Figure 4D:
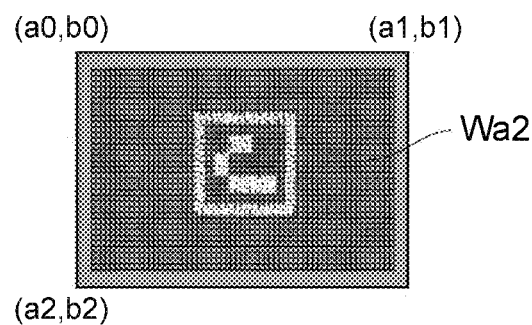

The two-dimensional plane image generation unit 222 projects the point group data constituting the three-dimensional plane detected by the three-dimensional plane detection unit 221 onto a two-dimensional plane to generate a two-dimensional plane image (FIGS. 4C and 4D). For example, the projection of the point group data onto the two-dimensional plane for the plane Wa detected by the three-dimensional plane detection unit 221 includes moving the respective point group data shown by the positions of three-dimensional coordinate values (X, Y, Z) to positions crossing the plane Wa in a perpendicular direction based on the plane Wa to generate the two-dimensional plane image. The three-dimensional coordinate values (X, Y, Z) of the respective point group data and color information shown by (R, G, B) are converted so as to correspond to each other as the pixel information (XY coordinate values and color information) of the two-dimensional plane image on the basis of the plane equation of the plane Wa. Thus, as shown in FIG. 4D, the two-dimensional plane image generation unit 222 generates a two-dimensional plane image Wa2. When the grain size of the point group data is coarse at this time, the two-dimensional plane image generation unit 222 may perform prescribed image processing (for example, smoothening processing such as Gaussian blur, pixel interpolation processing, or the like) on the point group data to generate the two-dimensional plane image Wa2.

Figure 4E:
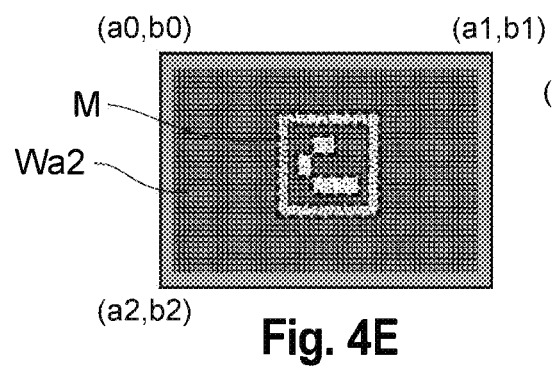

The marker detection unit 223 detects the marker M from the two-dimensional plane image Wa2 generated by the two-dimensional plane image generation unit 222 (FIG. 4E). For example, the marker detection unit 223 performs pattern matching with a marker image stored in advance to detect the marker M from the two-dimensional plane image Wa2 generated by the two-dimensional plane image generation unit 222.

Figure 4F:
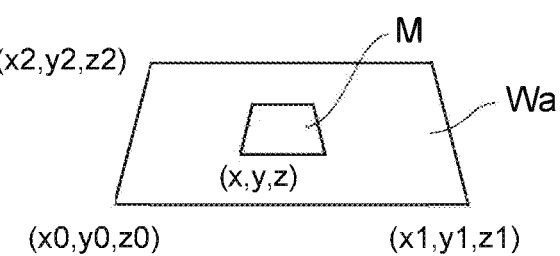

The marker position calculation unit 224 calculates, for the marker M included in the two-dimensional plane image Wa2 detected by the marker detection unit 223, three-dimensional coordinates on the plane Wa detected as the three-dimensional plane by the three-dimensional plane detection unit 221 (FIG. 4F). As described using FIGS. 4C and 4D, the two-dimensional plane image Wa2 is generated by moving the three-dimensional coordinate values (X, Y, Z) of the point group data constituting the plane Wa to the positions crossing the plane Wa in the perpendicular direction based on the plane Wa. However, the processing is performed reversely. That is, the position information of the marker M included in the two-dimensional plane image Wa2 is converted into the three-dimensional coordinate values (X, Y, Z) on the plane Wa serving as the three-dimensional plane.

Thus, the marker detection apparatus 220 appropriately detects the position of the marker M set on the plane Wa.

Marker Detection Method

Next, a method for detecting a marker by the marker detection apparatus 220 according to an embodiment of the present invention will be described in detail.

Figure 5:
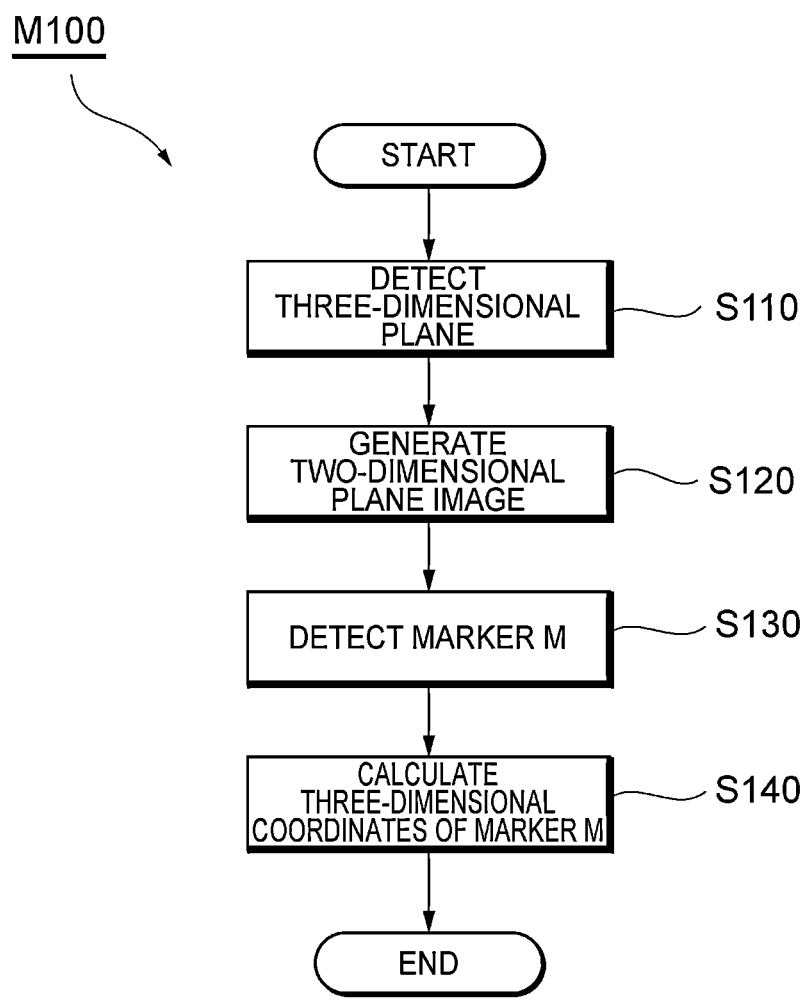
FIG. 5 is a flowchart showing the flow of the processing of a marker detection method M100 performed by the marker detection apparatus 220 according to an embodiment of the present invention.

FIG. 5 is a flowchart showing the flow of the processing of a marker detection method M100 performed by the marker detection apparatus 220 according to an embodiment of the present invention. As shown in FIG. 5, the marker detection method M100 includes steps S110 to S140, and the respective steps are performed by a processor included in the marker detection apparatus 220.

In step S110, the marker detection apparatus 220 detects, on the basis of point group data acquired by a 3D camera, a three-dimensional plane serving as a plane in a three-dimensional space (three-dimensional plane detections step). As a specific example, the three-dimensional plane detection unit 221 in the marker detection apparatus 220 detects, as a plane having a prescribed area or more, a plane Wa, a plane Wb, or the like constituting a workpiece W.

In step S120, the marker detection apparatus 220 projects point group data constituting the three-dimensional plane detected in step S110 onto a two-dimensional plane to generate a two-dimensional plane image (two-dimensional plane image generation step). As a specific example, the two-dimensional plane image generation unit 222 in the marker detection apparatus 220 moves, for the three-dimensional plane Wa detected in step S110, respective point group data shown by the positions of three-dimensional coordinate values (X, Y, Z) to positions crossing the plane Wa in a perpendicular direction based on the plane Wa to generate a two-dimensional plane image Wa2.

In step S130, the marker detection apparatus 220 detects a marker M from the two-dimensional plane image generated in step S120 (marker detection step). As a specific example, the marker detection unit 223 in the marker detection apparatus 220 performs pattern matching with a marker image stored in advance to detect the marker M from the two-dimensional plane image Wa2.

In step S140, the marker detection apparatus 220 calculates, for the marker M included in the two-dimensional plane image detected in step S130, three-dimensional coordinates in the plane detected as the three-dimensional plane in step S110 (three-dimensional coordinate calculation step). As a specific example, the marker position calculation unit 224 in the marker detection apparatus 220 converts the position information of the marker M included in the two-dimensional plane image Wa2 into three-dimensional coordinate values (X, Y, Z) on the plane Wa serving as the three-dimensional plane.

As described above, in the marker detection apparatus 220 and the marker detection method M100 according to an embodiment of the present invention, the three-dimensional plane detection unit 221 detects planes Wa and Wb in a three-dimensional space on the basis of point group data acquired by a 3D camera, and the two-dimensional plane image generation unit 222 projects the point group data constituting the plane Wa in a perpendicular direction based on the plane Wa to generate a two-dimensional plane image Wa2. Then, the marker detection unit 223 detects a marker M from the two-dimensional plane image Wa2, and the marker position calculation unit 224 calculates, for the marker M included in the two-dimensional plane image Wa2, three-dimensional coordinate values (X, Y, Z) in the three-dimensional plane Wa. Thus, it is possible to appropriately detect the position of the marker M set in the plane and easily detect the position of the marker M set in the plane without setting complicated camera parameters.

Moreover, in the robot teaching system 200 using the marker detection apparatus 220 according to an embodiment of the present invention, the camera coordinate system setting unit 212 sets, on the basis of the position of a marker M appropriately detected by the marker detection apparatus 220, a camera coordinate system with the position of the marker M as an origin O. The program generation unit 213 generates a working program for operating the manipulator 3, while converting the operation path of the manipulator 3 set in the camera coordinate system from the camera coordinate system into a robot coordinate system set in the robot control apparatus 2 on the basis of the set position of the marker M. Thus, it is possible to more easily perform welding at an appropriate welding position.

Note that in the present embodiment, the marker detection unit 223 detects the marker M for the plane Wa among the three-dimensional planes Wa and Wb detected by the three-dimensional plane detection unit 221. For example, a user may select which of a plurality of planes a marker is included, or a marker may be detected for each of a plurality of planes.

Actually, if the user grasps a plane in which a marker M is set, the marker detection unit 223 is able to efficiently detect the marker M along with the selection of the plane.

On the other hand, for example, if a marker is detected for each of a plurality of planes, automatic detection of a marker M is made possible as processing is proceeded on a step-by-step basis. Here, the detection of the marker from the plurality of planes may be performed in, for example, descending order of an area, order of distance from the center of a field of vision, or a combination of these orders.

It is highly likely that a marker M is set in a plane having a large area or a plane close to the center of a field of vision among a plurality of planes detected by the three-dimensional plane detection unit 221, and it is expectable that a marker is detected at an early stage when the marker is detected for each of the plurality of planes. This leads to a reduction in computation processing and shortening of a processing time.

Moreover, the order of detecting a marker from a plurality of planes is not limited to above orders so long as the marker is efficiently detectable.

As a specific example, a marker composed of a prescribed color (for example, red or the like) or a marker configured to contain a large amount of a prescribed color is used. Further, when a plurality of planes are detected by the three-dimensional plane detection unit 221, the plurality of planes are only required to be processed in descending order of a containing amount of a prescribed color. As for a plurality of planes, point group data constituting the respective planes includes color information shown by (R, G, B). On the basis of the color information, it is possible to determine the ratio of prescribed color information included in the respective planes on the basis of the color information.

As described above, a marker is composed of a prescribed color, whereby it is possible to efficiently detect a plane including the marker when a plurality of planes are detected by the three-dimensional plane detection unit 221. This leads to a reduction in computation processing and shortening of a processing time.

Further, the present embodiment describes, as an example, the marker detection apparatus 220 used in the robot teaching system 200 of the welding robot system 100. However, an industrial robot in which the marker detection apparatus 220 is used is not limited to the welding robot system 100. For example, the marker detection apparatus 220 is also applicable to robot systems, transportation robot systems, or the like that perform assembling, transportation, or the like of electronic components and machine components.

The embodiments described above aim to facilitate the understanding of the present invention and do not intend to interpret the present invention in a limited way. The respective constituting elements and their arrangements, materials, conditions, shapes, sizes, or the like are not limited to the exemplified ones and are adequately modifiable. Further, it is possible to partially replace or combine configurations shown in the different embodiments together.

What is claimed is:
1. A marker detection apparatus comprising:
at least one marker disposed on a plane of a three-dimensional plane of a workpiece to be welded, the at least one marker comprising at least one color information;
a three-dimensional plane detection unit that detects a plurality of three-dimensional planes serving as planes in a three-dimensional space based on point group data acquired by a 3D camera, the three-dimensional plane detection unit processing the plurality of planes in an order according to a ratio of color information detected in each of the three-dimensional planes;
a two-dimensional plane image generation unit that projects point group data constituting each detected three-dimensional plane in a direction perpendicular to the respective three-dimensional plane, thereby generating a two-dimensional plane image;
a marker detection unit that detects the marker from the generated two-dimensional plane image; and
a marker position calculation unit that, for the detected marker included in the two-dimensional plane image, calculates three-dimensional coordinates of the marker on the three-dimensional plane of the workpiece to be welded.
2. The marker detection apparatus according to claim 1, wherein
the marker detection unit detects the marker in descending order of areas with respect to the plurality of three-dimensional planes of the workpiece to be welded.
3. The marker detection apparatus according to claim 1, wherein
the marker detection unit detects the marker in order of distances from a center of a field of vision with respect to the plurality of three-dimensional planes of the workpiece to be welded.
4. The marker detection apparatus according to claim 1, wherein the marker detection unit detects the marker via pattern matching between the two-dimensional plane image and a stored marker image.

5. The marker detection apparatus according to claim 4, wherein the two-dimensional image plane is generated by moving the three-dimensional coordinate values of the point group data to the positions crossing the two-dimensional plane in a direction perpendicular to the two-dimensional plane.

6. The marker detection apparatus according to claim 1, wherein the plurality of planes are processed in a descending order according to the ratio of a prescribed color of the color information detected in each of the three-dimensional planes.

7. A robot teaching system comprising:
- a photographing unit having a 3D camera that photographs an image including a workpiece to be welded and a marker, wherein the marker is disposed on a three-dimensional plane of the workpiece to be welded, the marker comprising at least one color information;
- a three-dimensional plane detection unit that detects a plurality of three-dimensional planes serving as planes of the workpiece to be welded in a three-dimensional space based on point group data acquired by the 3D camera, the three-dimensional plane detection unit processing the plurality of planes in an order according to a ratio of the color information detected in each of the three-dimensional planes;
- a two-dimensional plane image generation unit that projects point group data constituting each detected three-dimensional plane in a direction perpendicular to the respective three-dimensional plane, thereby generating a two-dimensional plane image;
- a marker detection unit that detects the marker from the generated two-dimensional plane image;
- a marker position calculation unit that, for the detected marker included in the two-dimensional plane image, calculates three-dimensional coordinates of the marker on the three-dimensional plane of the workpiece to be welded;
- a camera coordinate system setting unit that sets a camera coordinate system based on the calculated three-dimensional coordinates of the marker; and
- a program generation unit that generates a working program for operating a manipulator, while converting an operation path of the manipulator in the camera coordinate system into a robot coordinate system set in a robot control apparatus.

8. The robot teaching system of claim 7, wherein the point group data acquired by the 3D camera and utilized to generate the two-dimensional plane image is processed via a smoothening process.

9. The robot teaching system of claim 8, wherein the smoothening process is a Gaussian blur process.

10. The robot teaching system of claim 8, wherein the smoothening process is a pixel interpolation process.

* * * * *